F. H. LEWIS & W. H. BAKER.
MACHINE FOR FORMING AND TEMPERING VEHICLE SPRINGS OR OTHER ELEMENTS.
APPLICATION FILED MAR. 8, 1915.

1,190,309.

Patented July 11, 1916.
7 SHEETS—SHEET 3.

F. H. LEWIS & W. H. BAKER.
MACHINE FOR FORMING AND TEMPERING VEHICLE SPRINGS OR OTHER ELEMENTS.
APPLICATION FILED MAR. 8, 1915.

1,190,309.

Patented July 11, 1916.
7 SHEETS—SHEET 7.

Witnesses
E. R. Barrett
Lena Weigand

Inventor
William H. Baker
Frederick H. Lewis
By S. E. Thomas
Attorney

UNITED STATES PATENT OFFICE.

FREDERICK H. LEWIS AND WILLIAM H. BAKER, OF JACKSON, MICHIGAN, ASSIGNORS TO LEWIS SPRING AND AXLE COMPANY, OF JACKSON, MICHIGAN, A CORPORATION OF MICHIGAN.

MACHINE FOR FORMING AND TEMPERING VEHICLE-SPRINGS OR OTHER ELEMENTS.

1,190,309.        Specification of Letters Patent.       Patented July 11, 1916.

Application filed March 8, 1915. Serial No. 13,012.

*To all whom it may concern:*

Be it known that we, FREDERICK H. LEWIS and WILLIAM H. BAKER, citizens of the United States, residing at Jackson, county of Jackson, State of Michigan, have invented a certain new and useful Improvement in Machines for Forming and Tempering Vehicle-Springs or other Elements, and declare the following to be a full, clear, and exact description of the same, such as will enable others skilled in the art to which it pertains to make and use the same, reference being had to the accompanying drawings, which form a part of this specification.

Our invention relates to a machine for forming and tempering vehicle springs or other bars to be shaped into a prescribed form and tempered, shown in the accompanying drawings and more particularly set forth in the following specification and claims.

One of the objects of our invention is to provide a machine in which certain metallic blanks and especially blanks for vehicle springs, may be bent into a predetermined form and tempered to retain the prescribed shape without the necessity of subsequent reheating to secure uniformity in a plurality of superimposed elements, as for example the overlying leaves of a vehicle spring.

Another feature of the invention consists in the peculiar shape given to the end of each of a group of adjustable fingers employed to grip the article to be formed and tempered;—the object being to reduce to the minimum the contacting end of the fingers that the surface of the article to be formed and tempered may be exposed as completely as possible to the oil of the tempering bath in its passage through the latter. The contacting edge of the end of each finger is therefore relatively narrow and in staggered relation to the contacting edge of the end of the adjacent finger; thus the oil is free to pass over practically the entire surface of the article tempered that so called "soft spots" may be avoided.

Other advantages and improvements will hereinafter appear.

In the drawings accompanying this specification.

Referring now to the letters of reference placed upon the drawings:—A, denotes the frame of the machine.

A', indicates an oil tank below the floor level of the frame.

B, is a transverse shaft journaled in the frame of the machine.

B', is a revoluble frame comprising a pair of spaced end frames b, b, keyed to the shaft B, and rotatable with the latter.

B², B², are grated platforms mounted upon the end frames b, b.

C, indicates a plurality of adjustable fingers carried upon each of the grated platforms B², and held against displacement by means of a cross member C', bolted to an upstanding flange B³ of the grated platform.

C², denotes a plurality of bolts carried by the rim B³, and respectively located directly back of the several adjustable fingers C'.

C³, indicates a group of springs respectively lodged in a recess formed in each of the several fingers, their projecting ends being acted upon by the bolts C², that the tension of the springs may be regualted.

C⁴, denotes adjustable bolts engaging the rim B³, and the sides of the fingers C, at each end of the group, to force the fingers into abutting relation.

Figure 1:
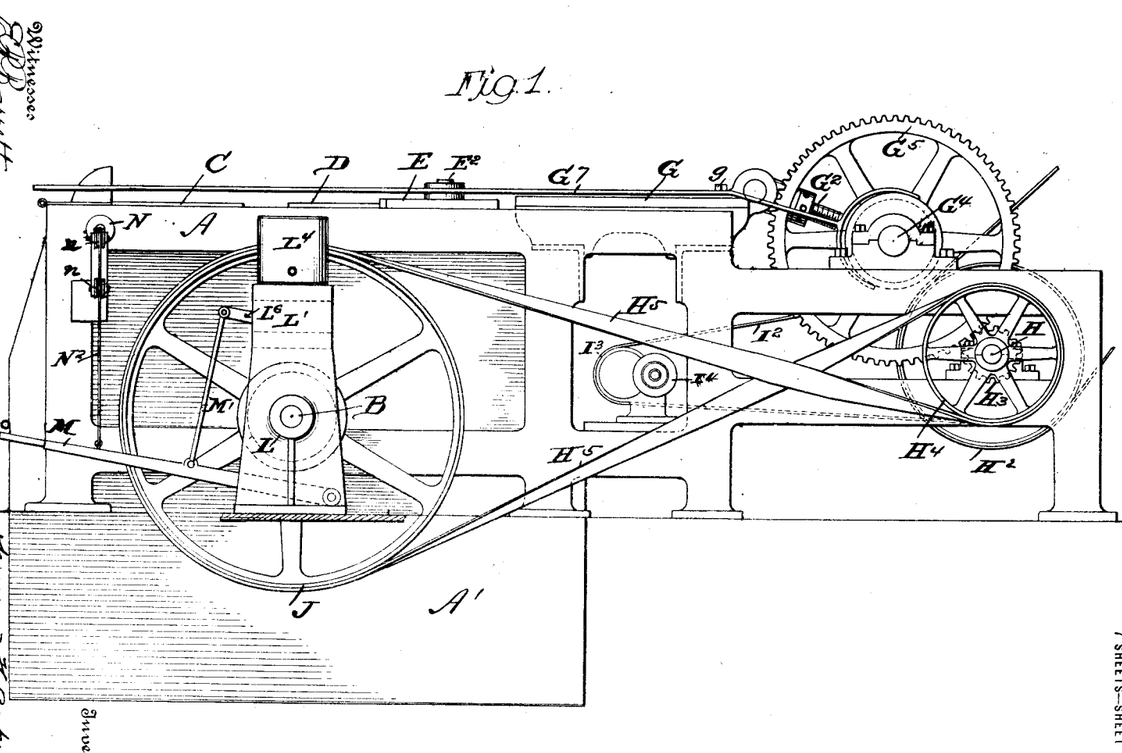
Figure 1, is a side elevation of the machine, and its oil tempering tank below the floor line.
Figure 2:
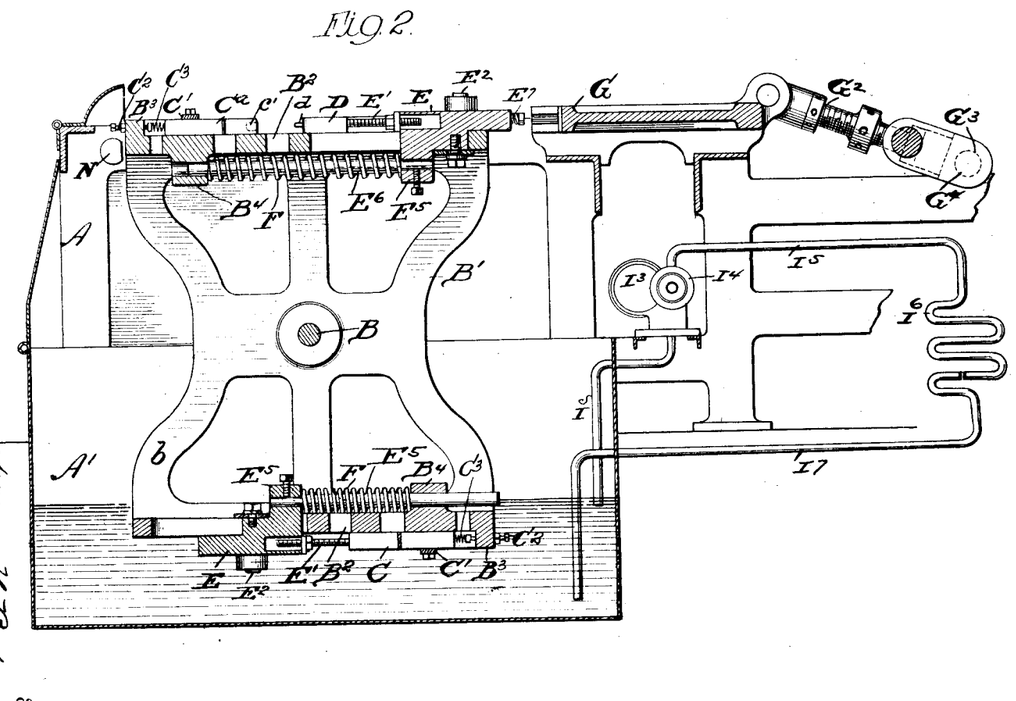
Fig. 2, is a longitudinal, vertical, sectional view through the machine, indicating diagrammatically an oil circulating pump and cooling coil for the oil bath.
Figure 3:
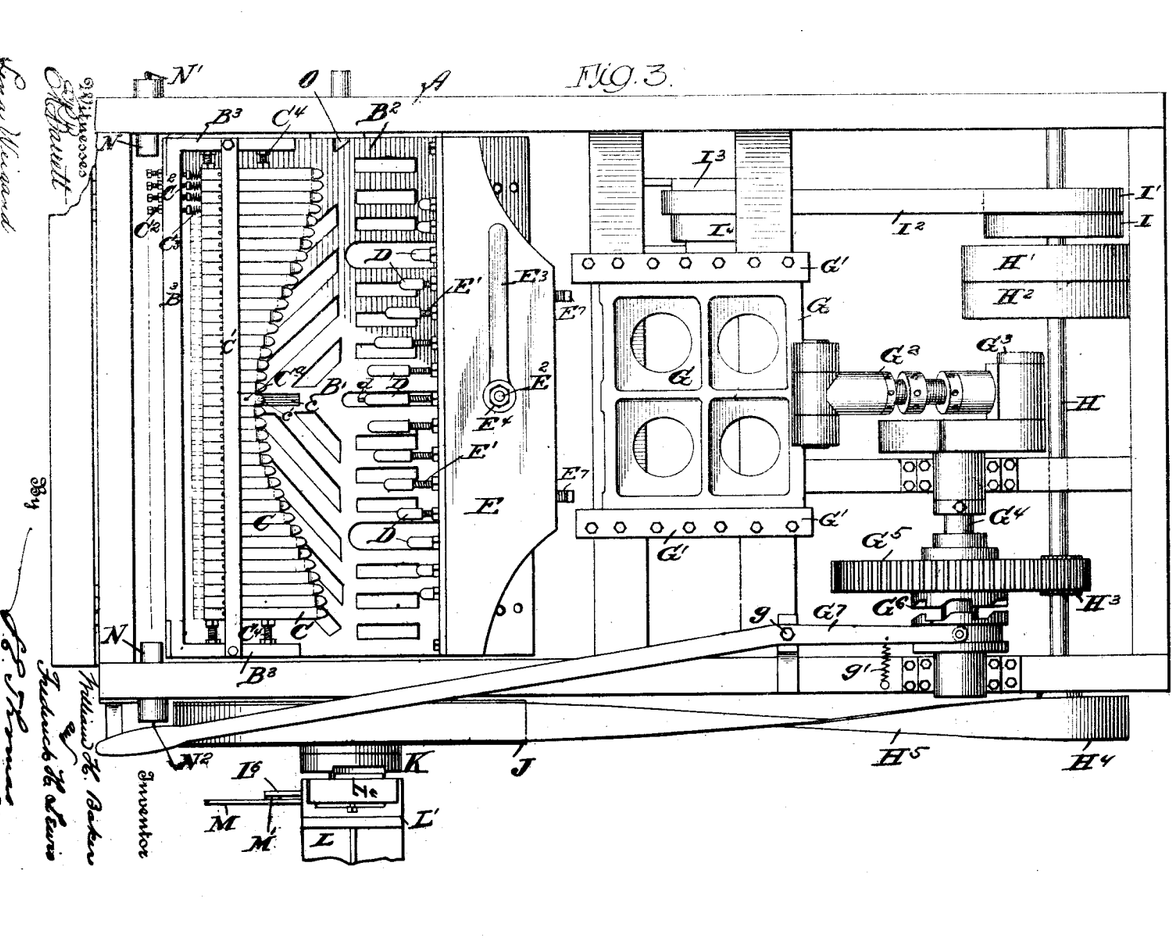
Fig. 3, is a plan view of the machine with parts broken away.
Figure 4:
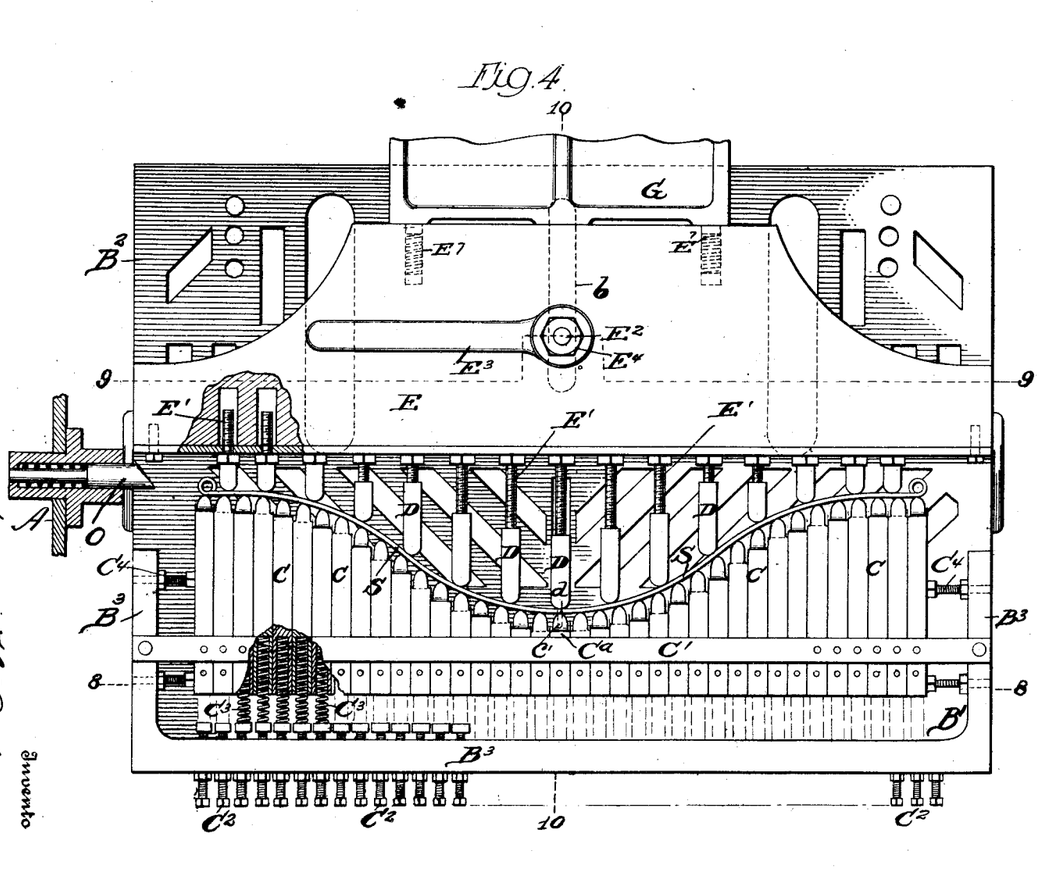
Fig. 4, is an enlarged plan view of the revoluble frame, showing a fragmentary portion of the supporting frame of the machine, and a fragment of the slidable ram.
Figure 5:
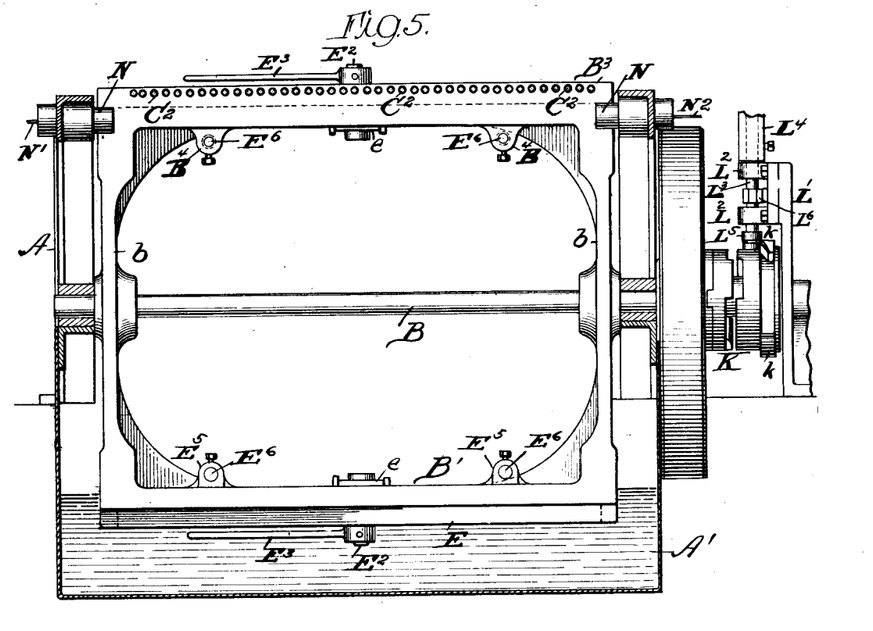
Fig. 5, is a cross sectional view through the supporting frame of the machine indicating in elevation the revoluble frame.
Figures 6, 7:
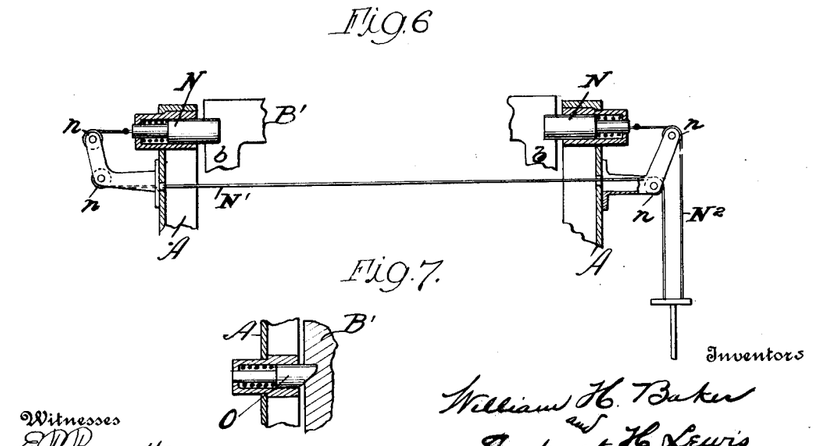
Fig. 6, is a fragmentary detail showing the spring-actuated plungers for limiting the rotation of the revoluble frame, indicating also the means for retracting the plungers that the frame may rotate.
Fig. 7, is a fragmentary detail of the spring actuated detent designed to arrest a reverse or backward movement of the revoluble frame.
Figure 8:
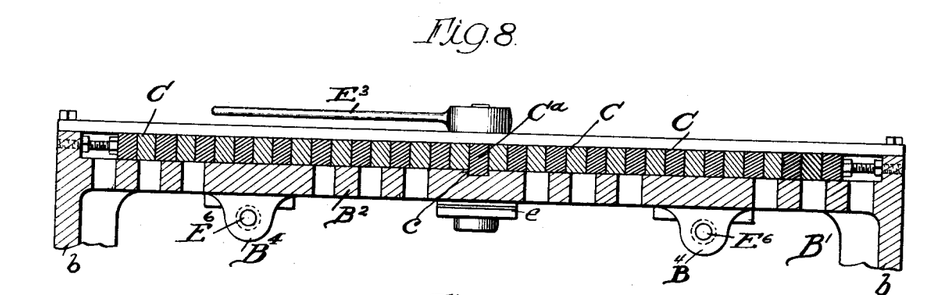
Fig. 8, is a fragmentary cross sectional view through the revoluble frame on line 8—8 of Fig. 4.
Figure 9:
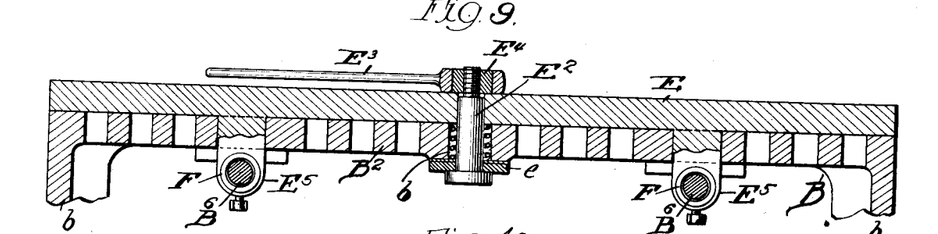
Fig. 9, is a similar view on line 9—9 of Fig. 4.
Figure 10:
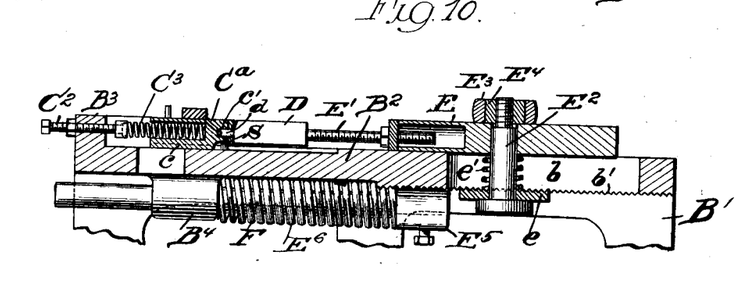
Fig. 10, is a fragmentary sectional view through the revoluble frame on line 10—10 of Fig. 4.

Cᵃ, denotes the middle finger of the group, partially lodged in a recess c formed in the grated platform B², to secure it against lateral displacement when assembling the respective fingers on either side of it. The finger Cᵃ is also provided at its end with a recess c',—indicated in dotted lines in Fig. 2,—to receive the projecting pin d, of the central finger of the opposing group of fingers D.

E, E, are slidable tables respectively mounted upon the grated platforms B², B².

E', denotes a plurality of adjustable bolts projecting outwardly from the edge of each of the slidable tables on which are respectively mounted the adjustable fingers D.

E², denotes a bolt carried by each of the slidable tables E, E, projecting through slot b, in the grated platforms B², B². The under surface of each grated platform surrounding the slot is serrated as indicated at b', to coöperate with a serrated plate e, carried by the bolt E² to secure the table when adjusted.

e', is a spring sleeved on the bolt, one end of which bears against the slidable table E, and the other end against the serrated plate e, to force it out of engagement with the serrated surface beneath the grated platform.

E³, denotes a lever engaging a nut E⁴ carried by the screw threaded end of the bolt E²;—by adjusting which the serrated plate e, may be drawn into interlocking relation with the co-acting serrations of the grated platforms to secure the table E, in its adjusted position.

Projecting down from the slidable tables E, E, through slots in the grated platform B², are lugs E⁵, pierced to receive shafts E⁶, which at their opposite ends are sleeved in the lugs B⁴, integral with the underface of the grated platforms B², B².

F, F, are springs coiled upon the shafts E⁶, their ends bearing against the respective lugs B⁴, E⁵;—the action of the springs being to force the slidable table with its bank of fingers D, away from the opposing group of fingers C, upon the release of the table by the manual operation of the lever E³.

E⁷, are spring bumpers projecting from the rear of the slidable tables E, to cushion their return when released by the levers E³.

G, denotes a reciprocating ram adapted when actuated to force the slidable table E, with its fingers D, toward the bank of fingers C, the ram being mounted in suitable guides G', bolted to transverse members of the frame of the machine.

G², is a pitman connecting the ram G, with the crank G³, carried by the shaft G⁴, in turn supported in suitable journals in the frame of the machine.

G⁵, is a gear loosely sleeved on the shaft G⁴.

G⁶, is a clutch, one portion of which is carried by the gear G⁵, the other portion being keyed to the shaft G⁴;—the clutch being manually operated by a lever G⁷ pivoted at g, to the frame of the machine.

g', is a spring engaging the frame of the machine and the lever G⁷, the action of which is to maintain the clutch in released relation until again manually thrown into engagement with its co-acting member.

H, denotes a main driving shaft journaled in the frame of the machine, on which are respectively mounted tight and loose pulleys H', H². H³, is a driving pinion in mesh with the gear G⁵, and adapted to actuate the latter. I, I', is another pair of tight and loose pulleys mounted upon the driving shaft H.

I², denotes a belt connecting the pulleys I, I', with a pulley I³, adapted to actuate the oil circulating pump I⁴.

I⁵, denotes a pipe leading to a cooling coil I⁶, and I⁷, is a pipe for returning the oil to the tank A.

H⁴, designates a pulley mounted on the shaft H, having a belt connection H⁵, with the pulley J, loosely mounted upon the shaft B.

K, is a clutch mechanism one member of which is carried by the pulley J, the other member being keyed to the shaft B.

L, is a journal for the shaft B, from which rises a standard L', having projecting brackets L², adapted to receive a vertical rod L³, slidable therein.

L⁴, is a weight mounted on the upper end of the rod L³ and L⁵, is a disk secured to the lower end adapted when in its lowermost position to act upon the cams k, k, carried by the slidable member of the clutch K, to force the latter out of interlocking engagement with the clutch member carried by the pulley J.

K', denotes a spring, the purpose of which is to force the slidable member of the clutch into locking relation with the clutch member carried by the pulley J, upon the disk $L^5$, being raised out of the path of the cams $k$, $k$. The rocking lever $L^6$ which serves to lift the disk is actuated by the foot treadle M, connected therewith by the link M'.

N, N, are spring actuated plungers respectively mounted in the side members of the frame of the machine.

N', $N^2$, are cables connected with the respective plungers N, N, and supported by pulleys $n$, journaled in brackets carried by the frame. The cables N', $N^2$, are connected with the treadle M, and upon pressure being applied to the latter the plungers are withdrawn from the path of the revoluble frame B'.

O, denotes a spring actuated detent, or bevel-faced latch, adapted to engage the revoluble frame to prevent its reverse rotation but permitting a counter-clockwise revolution.

Figures 11, 12, 13, 14, 15:
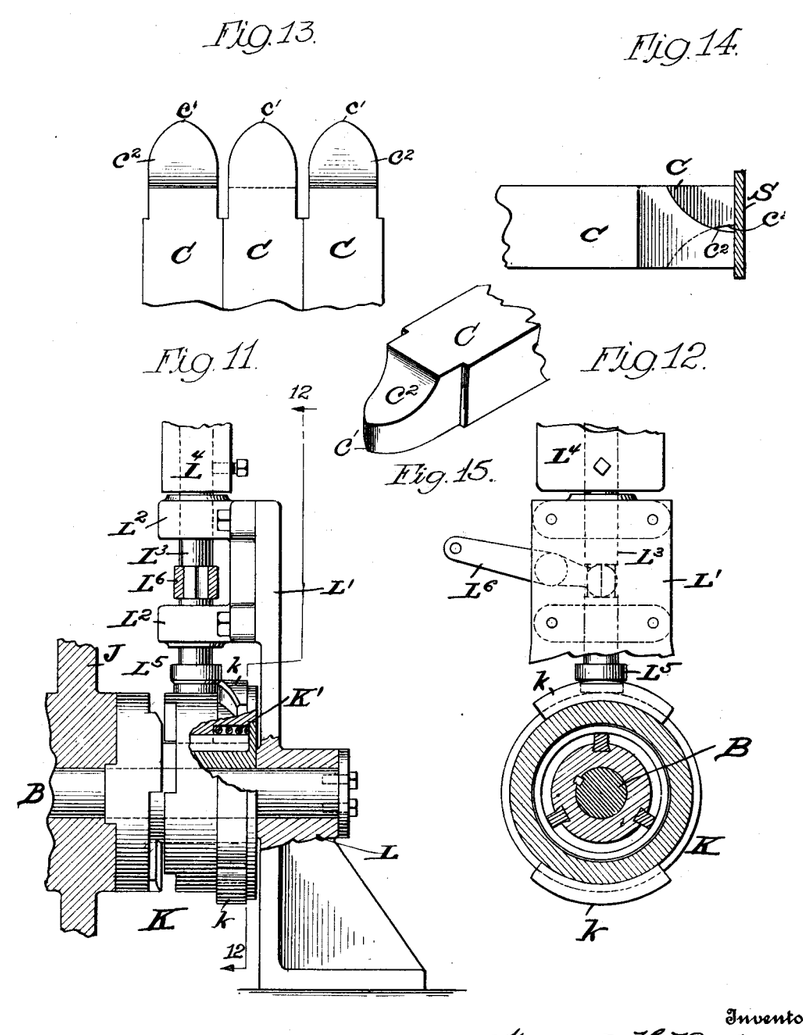
Fig. 11, is a fragmentary elevation partly in section of the clutch engaging and releasing mechanism controlling the rotation of the revoluble frame.
Fig. 12, is a fragmentary elevation of the clutch mechanism with parts in section, taken on line 12—12 of Fig. 11.
Fig. 13, is a fragmentary detail view of three contiguous adjustable fingers engaging the spring, showing the staggered formation of their contacting ends.
Fig. 14, is a side elevation of the same indicating the staggered relation of the contacting ends of the fingers with reference to each other and the spring, the latter being shown in cross section.
Fig. 15, is a fragmentary perspective view of the contacting end of a single finger.

The ends of the fingers C, are given a peculiar formation as shown in the detail view in Figs. 13—14—15, the extreme end of the fingers being substantially pointed as indicated at c',—each alternate finger being cut away upon its upper or underside as indicated at $c^2$, that approximately only one half of the thickness of the fingers may be in contact with the spring S. The staggered relation between the adjacent fingers of the contacting edges $c$, however serving to fully engage the opposite sides or edges of the spring at different points throughout its length, to insure against warpage. While the detail drawings indicate the ends of the fingers C, only as being cut away it is obvious that the fingers D, may be constructed likewise, but this has not been found necessary on account of the spaced relation of the fingers D, to each other. The surface of the spring being practically unobstructed by the contacting finger ends it may be tempered without danger of "soft spots" appearing.

Having indicated the several parts by reference letters the construction and operation of the machine will be readily understood:— For the purpose of this description it will be assumed that the element to be tempered is a flat leaf spring as employed in motor vehicle construction for supporting the body,—the leaves of the spring being perforated centrally to receive the usual engaging bolt or clip. A spring blank pierced for the passage of a central bolt is first heated, then placed upon the grated platform $B^2$, adjacent to the fingers D;—which together with the fingers C, have been previously adjusted so that their ends conform collectively to the shape it is desired to give to the spring. In placing the spring in position the pin $d$, of the central finger D, is inserted through the aperture in the blank that the latter may be secured against accidental lateral displacement, and that the formation of each end of the spring may be alike, or in accord with its predetermined form. The lever G, is then manually actuated to throw into engagement the clutch $G^6$, to rotate the gear $G^5$, through the operation of the driving pinion $H^2$, on the drive shaft H. The shaft $G^4$ is thus actuated and the pitman $G^2$ connecting the crank $G^3$ on the shaft $G^4$, with the ram G, moves the latter forward forcing the slidable table E, with its bank of fingers D, and spring blank S, toward the opposing group of fingers C, causing the spring blank to be shaped to conform to the curve described by the ends of the group of fingers C, and D,— any undue pressure upon the fingers C, through the forward movement of the ram being relived by the springs $C^3$. The lever $E^3$ is now actuated to force the serrated bar $e$, into engagement with the serrated underface of the grated platform thus locking the spring blank between the fingers D, of the slidable table and the opposing bank of fingers C, carried by the grated platform. The foot treadle M, is then manually depressed throwing into engagement the clutch mechanism K, due to the action of the spring K', which in turn forces the slidable member into locking engagement with its co-acting member carried by the pulley J. Simultaneously with the raising of the disk $L^5$, by the lever $L^6$, and foot treadle M, from contacting relation with the cam $k$,—and synchronous with the operation of the clutch mechanism, is the withdrawal of the spring actuated plungers N, N, from the path of the revoluble frame by the cables N', $N^2$, connected with the foot treadle. The revoluble frame B', is now free to rotate a one-half revolution, carrying the spring blank S, through the oil tempering bath A';—being driven by the pulley J, by belt from the driving pulley $H^4$, on the drive shaft H. The operator upon throwing in the clutch K, to start the rotation of the revoluble frame B', immediately releases the foot treadle M, permitting the spring actuated plungers N, N, to again intercept the path of the revoluble frame B' and simultaneously therewith the weighted shaft $L^3$, is released by the lever $L^6$, forcing the disk $L^5$, into the path of the clutch cam $k$, which in revolving contacts with the disk $L^5$, and forces the slidable member of the clutch out of its locked relation with the member carried by the pulley J. The revoluble frame thus ceases to rotate at every one-half revolution in order that the spring carried by the opposing platform $B^2$, through the tempering bath may be removed and replaced by a new blank. The plungers N, N, insure the stoppage of the rotatable table at the proper point, that the grated platform may be exactly level and in position for the fingers D, carried thereon to receive the thrust of the ram G, when actuated to shape and grip the spring blank between the respective groups of fingers C, and D. The spring actuated detent O, also assists in maintaining the grated platform level and while its bevel face permits of the free counter-clockwise movement of the rotatable frame, a backward or reverse movement of the rotatable frame is immediately arrested;—thus in conjunction with the plungers N, N, the grated platform may be held perfectly level during the operation of placing a spring blank and of removing the finished spring.

By providing a pump driven from the main drive shaft to convey the oil from the tempering bath through a cooling coil and back to the tempering bath, the latter may be kept at a temperature best adapted to give satisfactory results.

Having thus described our invention what we claim is:—

1. In a machine of the character described, a rotatable frame, a tank for a tempering fluid located beneath the rotatable frame, a plurality of adjustable fingers carried by the rotatable frame, a table slidable upon the rotatable frame, a plurality of adjustable fingers carried by the table, a ram normally spaced from the table, means for actuating the ram to slide the table whereby the fingers carried by the table may coöperate with the first named fingers to shape and grip a bar placed between their opposing ends, and means to rotate the rotatable frame in one direction to carry the bar in the one and same direction into and through the tempering fluid.

2. In a machine of the character described, a rotatable frame, a tank for a tempering fluid located beneath the rotatable frame, a plurality of adjustable fingers carried by the rotatable frame, a table slidable upon the rotatable frame, a plurality of adjustable fingers carried by the table, a ram, means for actuating the ram to slide the table whereby the fingers carried by the table may coöperate with the first named fingers to shape and grip a bar placed between their opposing ends, means to rotate the rotatable frame in one direction to carry the bar in the one and same direction into and through the tempering fluid, and means for arresting rotative movement of the rotatable frame at one point in its rotation to hold the bar in the tempering fluid.

3. In a machine of the character described, a rotatable frame, a plurality of grated platforms carried by the rotatable frame, a plurality of adjustable fingers grouped upon each grated platform, a slidable table carried by each grated platform, a plurality of adjustable fingers carried by each slidable table in opposing relation to the first named fingers to coöperate with the latter to shape and grip a bar placed between the ends of the fingers, a horizontally slidable ram to force the tables with their banks of fingers against the respective opposing bank of fingers carried by the respective grated platform to shape said bar when adjusted, and means for operating the ram.

4. In a machine of the character described, a rotatable frame, a plurality of grated platforms carried by the rotatable frame, a plurality of adjustable fingers grouped upon each grated platform, a slidable table carried by each grated platform, a plurality of adjustable fingers carried by each slidable table in opposing relation to the first named fingers to coöperate with the latter to shape and grip a bar placed between the ends of the fingers, a horizontally slidable ram to force the tables with their banks of fingers against the respective opposing bank of fingers carried by the respective grated platform to shape said bar when adjusted, means for operating the ram, and means to rotate the rotatable frame in one direction to carry the bar into and through the bath.

5. In a machine of the character described, a rotatable frame, a plurality of grated platforms carried by the rotatable frame, a plurality of adjustable fingers grouped upon each grated platform, a slidable table carried by each grated platform, a plurality of adjustable fingers carried by each slidable table in opposing relation to the first named fingers to coöperate with the latter to shape and grip a bar placed between the ends of the fingers, a horizontally slidable ram to force the tables with their banks of fingers against the respective opposing bank of fingers carried by the respective grated platform to shape said bar when adjusted, means for operating the ram, and cushioning means carried by each table for engagement by the ram to cushion the impact incident to engagement of the ram with the tables when the latter are forced by the ram against the fingers of the respective grated platform and to cushion the table when the latter engages the ram when the latter is moved to normal position.

6. In a machine of the character described, a stationary frame, a second frame rotatably journaled in the stationary frame, a plurality of grated platforms carried by the rotatable frame, a plurality of adjustable fingers grouped upon each grated platform, a slidable table carried by each grated platform, a plurality of adjustable fingers carried by each slidable table in opposing relation to the first named fingers to coöperate with the latter to shape and grip a bar interposed between the ends of the fingers, a ram slidable on the stationary frame and normally spaced from the rotatable frame, means to slide the ram toward the rotatable frame to force each table separately with its bank of fingers against the opposing bank of fingers carried by the respective grated platform to shape and grip said bar, and means to rotate the rotatable frame.

7. In a machine of the character described, a stationary frame, a second frame rotatably journaled in the stationary frame, a plurality of grated platforms carried by the rotatable frame, a plurality of adjustable fingers grouped upon each grated platform, a slidable table carried by each grated platform, a plurality of adjustable fingers carried by each slidable table in opposing relation to the first named fingers to coöperate with the latter to shape and grip a bar interposed between the ends of the fingers, a ram slidable on the stationary frame and normally spaced from the rotatable frame, and means to slide the ram toward the rotatable frame to force each table separately with its bank of fingers against the opposing bank of fingers carried by the respective grated platform to shape and grip said bar.

8. In a machine of the character described, a rotatable frame, a tank for a tempering fluid located beneath the rotatable frame, means carried by the rotatable frame to shape and grip a bar thereon, a slidably mounted ram normally spaced from the rotatable frame, means to actuate the ram to actuate said shaping and gripping means on the rotatable frame, means for locking said shaping and gripping means when actuated by the ram, and means for rotating the rotatable frame to carry the bar through the tempering fluid in said tank.

9. In a machine of the character described, a rotatable frame, a tank for a tempering fluid located beneath the rotatable frame, means carried by the rotatable frame to shape and grip a bar thereon, a slidably mounted ram normally spaced from the rotatable frame, means to actuate the ram to actuate said shaping and gripping means on the rotatable frame, means for locking said shaping and gripping means when actuated by the ram, means for rotating the rotatable frame to carry the bar through the tempering fluid in said tank, and means for unlocking the aforesaid locking means of the shaping and gripping means.

10. In a machine of the character described, a rotatable frame, a grated platform on the frame, a bank of fingers carried by the grated platform, a slidable table, a bank of fingers carried by the table for coöperation with the first named fingers to grip and shape a blank bar interposed between the opposing banks of fingers, means for moving said table with its fingers toward the fingers carried by the grated platform, means for locking the table to firmly grip the blank bar between the opposing ends of the respective banks of fingers, means for subsequently returning the table with its fingers to normal position, a tank to receive a tempering bath located beneath the rotatable frame, and means to rotate the rotatable frame in one direction to carry the blank bar in one and the same direction through the tempering fluid in said tank.

11. In a machine of the character described, a frame rotatable upon a horizontal axis, a tank for a tempering fluid located beneath through which the frame rotates, a plurality of adjustable fingers carried by the rotatable frame, a table slidable upon the rotatable frame, a plurality of adjustable fingers carried by the slidable table, means for actuating the table, means for rotating the frame in one and the same direction throughout a complete revolution, and means to prevent a reverse rotation of the frame.

12. In a machine of the character described, a frame rotatable upon a horizontal axis, a tank for a tempering fluid located beneath through which the frame rotates, a plurality of adjustable fingers carried by the rotatable frame, a table slidable upon the rotatable frame, a ram, means to operate the ram to slide the table, a plurality of adjustable fingers carried by the slidable table, means for rotating the frame in one and the same direction throughout a complete revolution, a clutch mechanism adapted to connect and release the rotatable frame with and from the driving means, means for manually applying the clutch mechanism, means for automatically releasing the clutch mechanism, means to insure the stoppage of the rotatable frame at predetermined points in its revolution to hold one end of the rotatable frame temporarily in the fluid of said tank, and means adapted to prevent a reverse rotation of said frame.

13. In a machine of the character described, a rotatable frame, a tank to receive a tempering fluid through which the frame revolves, a grated platform carried by the frame, a plurality of adjustable fingers carried by the grated platform one of which is partially lodged in a groove formed in the platform, means for forcing the adjustable fingers into sidewise abutting relation and against the finger lodged in the groove of the grated member, whereby lateral displacement of the fingers may be prevented, a movable table slidable upon the grated platform, a group of adjustable fingers carried by the movable table in opposing relation to the first named group of fingers, a pin carried by one of said fingers adapted to project through blanks to be held and shaped between the opposed groups of fingers, the end of the finger opposing said pin being provided with a recess to receive the projecting end of the pin, and means for moving the table with its bank of fingers toward the bank of fingers carried by the grated platform, and means to rotate the rotatable frame throughout a complete revolution so as to rotate one end of the frame entirely through the tempering fluid of said tank.

14. In a machine of the character described, a rotatable frame rotatable upon a horizontal axis, oppositely disposed grated platforms carried by the revoluble frame and rotatable therewith, a plurality of adjustable fingers grouped and supported upon each grated platform, a spring located back of each finger, means for adjusting the tension of the springs, a slidable table carried by each grated platform, a plurality of adjustable fingers carried by the tables in opposing relation to the first named fingers and adapted to coöperate therewith to grip and shape a bar placed between the opposed banks of fingers, means for forcing the slidable table with its fingers toward the fingers carried by the grated platform, means for securing the table when adjusted, means for returning the table to its normal position when released, means for rotating the rotatable frame, and a tank to receive a tempering fluid through which the rotatable frame rotates to carry said bar in one direction into and out of the tank and through the tempering fluid.

15. A spring setting and tempering machine, comprising a plurality of bending heads, a receptacle for a bath, a movable carrier for said bending heads extending into said receptacle, mechanism independent of said carrier and mounted in operative relation thereto and arranged to actuate said bending means, means arranged to move said carrier and bring said heads in succession into operative relation to said actuating mechanism and into the bath, and means for locking said carrier with a bending head in position to be actuated by said actuating mechanism.

16. A spring setting and tempering machine, comprising a plurality of bending heads, a receptacle for a bath, a movable carrier for said bending heads extending into said receptacle, mechanism independent of said carrier and mounted in operative relation thereto and arranged to actuate said bending means, mechanism for moving said carrier to bring said bending heads in succession into operative relation to the actuating mechanism and into the bath, a lock arranged to lock said carrier with a bending head in position to be actuated by said actuating mechanism, and means arranged to simultaneously actuate said lock and said carrier moving mechanism and so arranged as to bring the lock into engagement with the carrier when rendering the moving mechanism inoperative, and vice versa.

17. A spring setting and tempering machine, comprising a rotatable carrier arranged to extend into a tempering bath, spring bending heads mounted on said carrier, mechanism independent of said carrier and mounted in operative relation thereto and arranged to actuate said bending heads, intermittently acting mechanism for rotating said carrier to bring said bending heads in succession into operative relation to the actuating mechanism and into the bath, a lock arranged to lock said carrier with a bending head in position to be actuated by said actuating mechanism, and means arranged to simultaneously actuate said lock and said carrier rotating mechanism and so arranged that when the lock is brought into engagement with the carrier the rotating mechanism is rendered inoperative, and vice versa.

18. A spring setting and tempering machine, comprising a plurality of bending heads, a receptacle for a bath, a movable carrier for said bending heads extending into said receptacle, mechanism mounted in operative relation to said carrier and arranged to actuate said bending heads, means for locking said bending heads in closed position after actuation, and mechanism for moving said carrier to bring said bending heads in succession into operative relation to the actuating mechanism and into the bath.

19. A spring setting and tempering machine, comprising a plurality of bending heads, a receptacle for a bath, a movable carrier for said bending heads extending into said receptacle, mechanism mounted in operative relation to said carrier and arranged to actuate said bending heads, means for locking said bending heads in closed position after actuation, springs arranged to open said heads when said locking means is released, and mechanism for moving said carrier to bring said bending heads in succession into operative relation to the actuating mechanism and into the bath.

In testimony whereof, we sign this specification in the presence of two witnesses.

FREDERICK H. LEWIS.
WILLIAM H. BAKER.

Witnesses:
P. A. SHARKEY,
CHAS. HENMAN.